(12) United States Patent
Hao

(10) Patent No.: US 6,549,620 B2
(45) Date of Patent: Apr. 15, 2003

(54) SIGNAL TRANSFER POINT LOCAL NUMBER PORTABILITY DATABASE AUDIT SYSTEM AND METHOD

(75) Inventor: Tianbao Hao, Plano, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 10/192,569

(22) Filed: Jul. 10, 2002

(65) Prior Publication Data

US 2002/0176562 A1 Nov. 28, 2002

Related U.S. Application Data

(63) Continuation of application No. 09/431,375, filed on Nov. 1, 1999.

(51) Int. Cl.$^7$ ................................................ H04M 7/00
(52) U.S. Cl. .......................... 379/221.13; 379/221.1; 707/200
(58) Field of Search ........................... 379/207.02, 219, 379/221.08, 221.1, 221.13; 707/200, 201, 204

(56) References Cited

U.S. PATENT DOCUMENTS

| 6,154,534 A | 11/2000 | Bredberg et al. | 379/207.02 |
| 6,169,793 B1 | 1/2001 | Godwin et al. | 379/221.09 |

*Primary Examiner*—Harry S. Hong
(74) *Attorney, Agent, or Firm*—V. Lawrence Sewell; Craig A. Hoersten

(57) ABSTRACT

A method of auditing a first local number portability database (31) associated with a first signal transfer point (22) includes sending, by a first audit manager (26), a request to the first signal transfer point (22), the request specifying at least one ported telephone number. A first audit agent (30) receives the request at the first signal transfer point (22), looks up the specified at least one ported telephone number in the first local number portability database (31), and obtains at least one corresponding local routing number. The first audit agent (30) then sends the at least one corresponding local routing number to the first audit manage (26). The audit manager (26) then compares the received at least one corresponding local routing number to data local to the first audit manager (26). The audit manager (26) then reports the result of the comparison.

9 Claims, 2 Drawing Sheets

SIGNAL TRANSFER POINT LOCAL NUMBER PORTABILITY DATABASE AUDIT SYSTEM AND METHOD

PRIORITY UNDER 35 U.S.C. §119(e) & 37 C.F.R. §1.78

This nonprovisional application claims priority bas United States nonprovisional patent application entitled: Signal Transfer Point Local Number Portability Database Audit System and Method, Ser. No. 09/431,375, filed Nov. 1, 1999, in the name of: Tianbao Hao, now abandoned, which is hereby incorporated by reference for all purposes.

TECHNICAL FIELD OF THE INVENTION

This invention is related in general to the field of telecommunications equipment. More particularly, the invention is related to signal transfer point local number portability database audit system and method.

BACKGROUND OF THE INVENTION

Local number portability (LNP) is a relatively recent development in the telephone industry that allows a telephone service subscriber to change the telephone company or carrier providing the service without having to change telephone numbers. Numbering plan splits in growing metropolitan areas to accommodate more subscriber telephone numbers also requires the local number portability service to properly route calls. To enable local number portability, centralized regional entities called the number portability administration center (NPAC) have been established to store and update the location and associated data on the ported telephone numbers residing in the telecommunications switching network. In addition, each service provider is required to provide a local service management system (LSMS) that will accept from NPAC the data related to telephone numbers and associated LNP data and then propagate them to signal transfer points (STPs) serviced by each service provider.

Between NPAC and SMS, the NPAC SMS Interoperability Interface Specification document prepared for the North American Number Council (NANC) contains the information model for the NPAC and SMS mechanized interfaces Between SMS and STP, typically CMIP/CMISE protocol is used, where CMIP/CMISE messages containing LNP data are exchanged between a software process called object manager running in SMS and a software process called object agent running in STP.

Typically, the signal transfer points are configured as mated pairs to operate in a load-sharing manner and to provide redundancy. Therefore, the local number portability databases maintained by mated pairs should contain identical data.

Due to a number of possible failures, the data in a local number portability database maintained by one signal transfer point may not match the data at its mate. Failures which may cause a data mismatch includes link failure between the local service management system and one of the signal transfer point nodes, hardware or software failure at one of the signal transfer point nodes, power failure at one of the signal transfer point nodes, or software/hardware maintenance, diagnosis, or upgrade during local number portability data update. Further, data mismatch may be caused by extended delays in data update request between the local service management system and one of the signal transfer points.

When data update requests are unsuccessful due to signal transfer point failure, maintenance, or extended network delays, some local service management system may have the capability to hold off or buffer update requests for approximately 15 minutes which, at a maximum allowable of 25 updates per second, may be a maximum of 22,500 updates. Most often, the failed signal transfer point is not able to recover within 15 minutes from failure or maintenance procedures. The problem is also intensified due to the size of a local number portability database, which typically has millions of entries.

Currently, there is no detection method to determine whether a mismatch condition in the data of the mated pairs exists. As a result, errors may occur when erroneous data is used to route calls to ported telephone numbers. Due to the nature of load sharing between mated STP pairs, the errors seem intermittent to callers, as one STP contains the new correct data and the other contains the old erroneous data.

SUMMARY OF THE INVENTION

Accordingly, there is a need for a system and method to detect data mismatch in the local number portability databases of mated signal transfer point pairs.

In one aspect of the invention, a method of auditing a first local number portability database associated with a first signal transfer point includes sending, by a first audit manager, a request to the first signal transfer point, the request specifying at least one ported telephone number. A first audit agent receives the request at the first signal transfer point, looks up the specified at least one ported telephone number in the first local number portability database, and obtains at least one corresponding local routing number. The first audit agent then sends the at least one corresponding local routing number to the first audit manager. The audit manager then compares the received at least one corresponding local routing number to data local to the first audit manager. The audit manager then reports the result of the comparison.

In another aspect of the invention, an automated method of determining data discrepancy in first and second mirrored databases is provided. The method includes sending, by a first audit manager, a request to access specific entries in the first database. A first audit agent associated with the first database then receives the request, looks up the specified entries in the first database, and obtains data corresponding thereto. The first audit agent sends the data to the first audit manager. The audit manager then compares the received data to data previously-obtained by the first audit manager, and reports the result of the comparison.

In yet another aspect of the invention, a signal transfer point local number portability audit system includes an audit manager operable to compose and send an audit request message to an audit agent associated with a first local number portability database. The audit request message specifies at least one ported telephone number. The audit agent is operable to receive the audit request message, look up the specified at least one ported telephone number in the first local number portability database, and composing and send an audit response message to the audit manager. The audit response message includes at least one local routing number corresponding to the specified at least one ported telephone number. The audit manager is operable to receive the audit response message, and compare the received at least one local routing number with at least one local routing number accessed from a second local number portability database. The audit manager then generates a report on the result of the comparison.

BRIEF DESCRIPTION OF THE DRAWINGS

For a better understanding of the present invention, reference may be made to the accompanying drawings, in which.

DETAILED DESCRIPTION OF THE INVENTION

Figure 1:
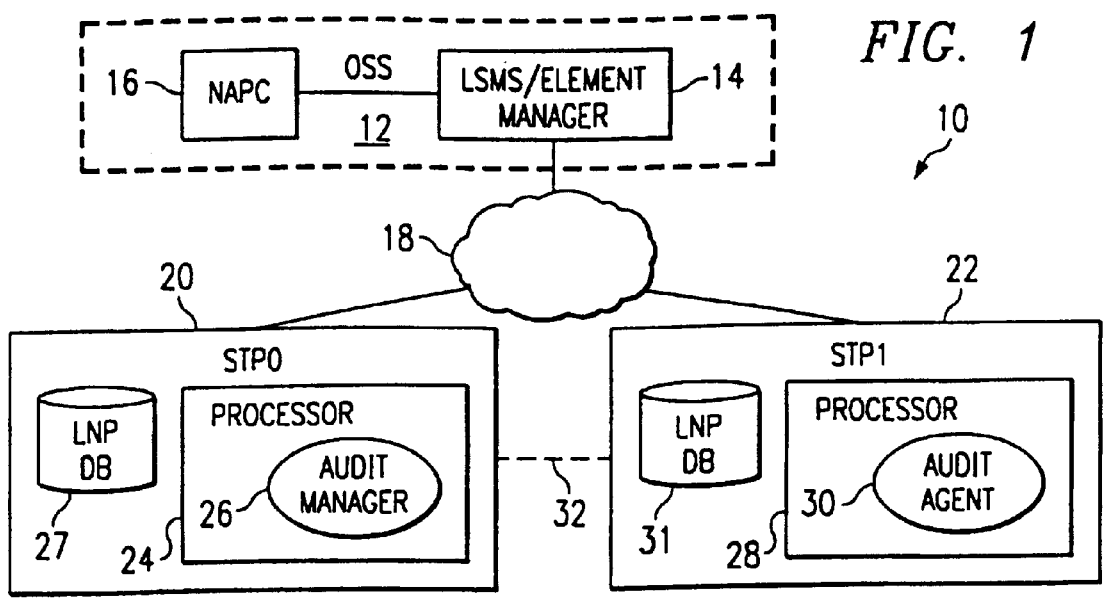
FIG. 1 is a simplified block diagram of the telecommunication network according to an embodiment of the present invention.

FIG. 1 is a simplified block diagram of the telecommunication network 10 according to an embodiment of the present invention. Telecommunication network 10 includes an operational support system (OSS) 12 which encompasses a local service management system (LSMS) 14 coupled to a number portability administration center (NPAC) 16. Local service management system 14 may also be referred to as an element manager (EM). Local service management system 14 is coupled to at least one mated pair of signal transfer point nodes (STP0 and STP1) 20 and 22 via some network links 18. Typically, network links 18 are CMIP/CMISE (common management information protocol/common management information service element) over TCP/IP/Ethernet (transmission control protocol/Internet protocol/Ethernet) network links but other protocols may be used.

Signal transfer point 20 includes a processor or computing platform 24, on which an audit manager process 26 (a CMISE/CMIP object manager as in LSMS) is executing. A local number portability database 27 for storing ported telephone numbers (TNum) and the corresponding location routing numbers (LRNs) resides in signal transfer point 20. Local number portability database 27 may also store global title translation numbers (GTTs) corresponding to the ported numbers. Signal transfer point 22 is the mate of signal transfer point 20. Signal transfer point 22 also includes a processor or computing platform 28. An audit agent process 30 (a CMISE/CMIP object agent) executes on processor 24 and responds to requests from auditing process 24. The object agent process could be the same as the one that responds to Object Manager in SMS, or could be a different process with different priority if real-time impact is a concern. A local number portability database 31 also resides on processor 24. Typically, the signal transfer point mated pair operates on a load-sharing basis so that both signal transfer points 20 and 22 operate actively and concurrently to share the workload. Because both signal transfer points handle incoming ported telephone number translation requests concurrently, their respective databases must be synchronized and have matching data. Depending on implementation, there may also exist a direct link 32 between signal transfer points 20 and 22, which may operate under any suitable communication protocol.

In operation, NPAC 16 sends local number portability ported telephone number update requests to local service management system 14, which in turn-dispatches the update requests to signal transfer points 20 and 22 under its control and management. But due to failure conditions, some update requests may not reach or be properly processed by one of the signal transfer point nodes. The failure conditions may include network link failures that results in an update request being delayed or not reaching one of the signal transfer points, and hardware or software malfunction, maintenance, or upgrade at one of the signal transfer points. This failure may result in data mismatch between local number portability databases 27 and 31. Audit manager 26 and audit agent 30 are processes that perform audits to detect data mismatch between the databases according to the teachings of the present invention.

Figure 2:
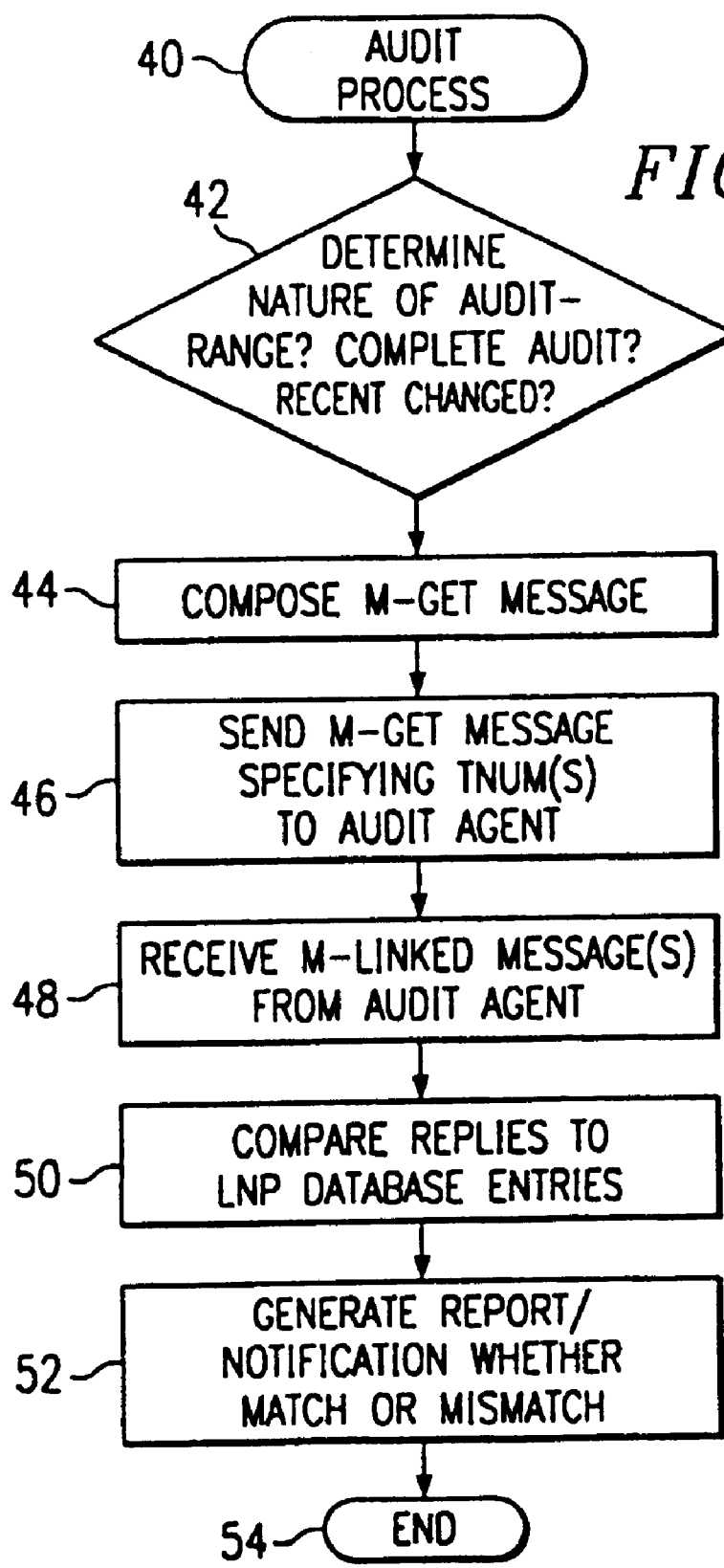
FIG. 2 is a flow chart of the audit process according to an embodiment of the present invention.

FIG. 2 is a flowchart of an audit method or process 40 according to an embodiment of the present invention. Audit process 40 may be invoked by a user-issued command on the command line or may start automatically at a predetermined time, executed in a periodic manner for maintenance or diagnosis, or executed whenever auditing is desired. For example, daily audits may be scheduled to take place when network traffic is at a minimum. In block 42, the nature of the audit is determined.

An audit may be a full audit covering all ported numbers, or a partial audit covering a certain range of ported numbers, or a recent change audit covering those recently changed by consulting a record or log maintained by audit manager 26 or by another process at signal transfer point 20. The log may be an existing update request log maintained at each signal transfer point, which is a circular buffer of a predetermined size that records the most recent update requests from the local service management system. A more reliable method may be to copy all un-audited ported telephone number updates from the existing update request log to a second log before being overwritten. Un-audited entries in the update request log may be determined by comparing its time stamp with the start time of the last audit. Using capabilities provided by CMISE/CMIP (e.g., scoping, filtering and etc.), an audit may be checking all the fields or attributes of LNP data entry, or just checking certain fields or attributes (e.g. only LRN, or only GTT). Moreover, an audit may be checking only LNP data entries meeting certain criteria, for example all LNP data entries with a certain LRN.

In block 44, a M-GET CMIP/CMISE message is composed of the ported telephone number(s) or range of ported telephone numbers (TNum), and the IP address of processor 28 at signal transfer point 22. If signal transfer point 22 has more than one processor, the IP address specifies the destination processor on which audit agent 30 resides. For example, signal transfer points 20 and 22 each typically includes at least two processors operating in active-standby mode. The IP address specifically identifies the destination processor. Other CMIP/CMISE message parameters may also be included but are not relevant to the discussion herein.

Figure 3:
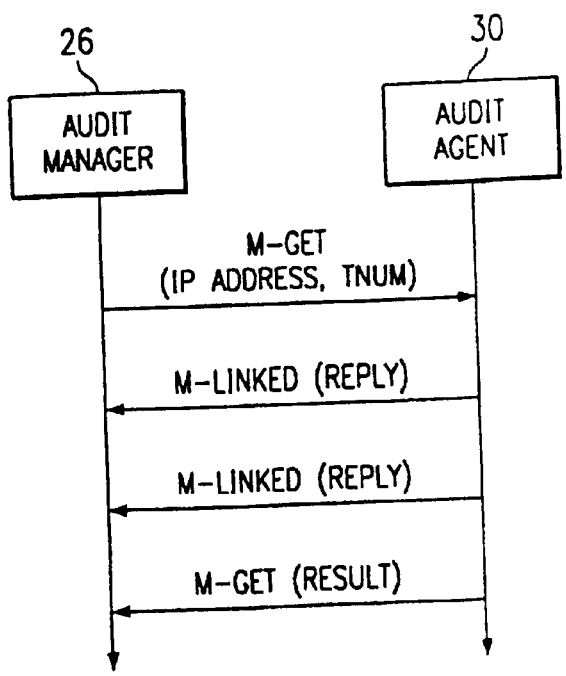
FIG. 3 is a message flow diagram of audit messages according to an embodiment of the present invention.

Referring also to FIG. 3, a message flow diagram of audit messages according to an embodiment of the present invention is shown. Audit manager 26 composes and sends the M-GET message to audit agent 30, as shown in block 46 in FIG. 2. As described above, the M-GET message includes an IP address of the destination where audit agent 30 resides, and one or more telephone numbers, or a range of telephone numbers. The M-GET message is received by audit agent 30 and requests the audit agent process 30 to responds. Audit agent 30 analyzes the M-GET message and determines which telephone numbers the audit manager is interested in auditing. Audit agent 30 then looks up, in its local number portability database 31, the ported telephone number or numbers specified in the M-GET message and composes one or more M-LINK messages containing the local routing numbers and GTT corresponding to the specified ported telephone numbers. Each M-LINK message may contain a predetermined number of LNP data entries. Therefore, if the request exceeds the predetermined number, additional M-LINK messages are composed and sent. Audit agent 30 composes and sends the M-LINK messages to audit manager 26. Although not shown specifically, the M-LINK message includes the IP address of processor 24 and the LNP data entries requested by audit manager 26. In blocks 48 and 50, audit manager 26 receives the M-LINK messages and compares the returned LNP data entries with the data stored in its own local number portability database 27. Whenever there is a discrepancy between the data from audit agent 30 and the data stored in its database, local number portability data mismatch exists. At the end of transmission of M-LINK messages, audit agent 30 sends a M-GET message reporting whether the process was successful or failed, as shown in block 52. A report (such as an IPR or information problem report) or some form of notification is then generated by audit manager 26 to indicate whether a data mismatch was detected by the audit, as shown in block 54. The report may be printed, stored in a predetermined location, or transmitted to a predetermined recipient or processor, or invoke a certain software program for automated corrective actions. The method of transmission may be by electronic mail, by facsimile, by paging, or any other form of communication to a craft. The form of transmission may be determined by the extent of data mismatch. For example, if the number of mismatched data is great, a craft may be notified immediately by paging. It is noted that due to LSMS update request propagation delays, LNP data entries may be changed at slightly different times at the mated STP pairs. Therefore, if a mismatch is detected, a second check on the very LNP data entry may be performed again after a certain time window before a mismatch is declared.

It may be seen that that data mismatch may be one of three types from audit manager perspective: missing data, extra data, or content-different data. With unidirectional audit where the audit manager resides on one signal transfer point and auditing the data in the second signal transfer point, all three types of mismatch can be correctly detected for full audit and partial audit because audit manager is able to specify a range of LNP data entries. But for recent change audit, only the missing data and content-different data may be detectable assuming audit agent software is not enhanced. Therefore, the invention also contemplates having audit managers and audit agents resident at both signal transfer points to enable bi-directional audit. Alternatively, the audit manager may be resident in a third network node, such as at the local service management system, which compares data received from both signal transfer points.

The use of CMIP/CMISE messages as described above is provided as an example and is currently preferred because this is the format presently used for local number portability data update requests between local service management system 14 and signal transfer points 20 and 22. Therefore, each signal transfer point already possess an agent process residing thereon for responding to data update requests from a CMISE manager residing on local service management system 14. Further, the inclusion and use of an audit manager 16 which communicates with a pre-existing audit agent 30 enables a quick and straightforward implementation of an audit system and process because the approach requires no new hardware, no new software in audit agent and only a small amount of new software at audit manager for user interface into the CMISE/CMIP Object Manager software. However, the present invention also contemplates using another communication protocol and message format to accomplish the audit (for example, using message compaction, or sending LNP data checksum instead of each LNP data entry). Further, the path of communicating the audit messages may be direct link 32 rather than network 18.

Further, it is also contemplated by the present invention that audit manager 26 may reside outside of a signal transfer point, such as a third network node having a connection to the signal transfer point mated pair. For example, the audit manager may reside on the local service management system and be used to audit plural mated pairs of signal transfer point local number portability databases and compare with the database at the local service management system or comparing the data received from the mated pairs.

The audit manager and audit agent may be platform-independent object-oriented processes that can be deployed on computing platforms. The communication mechanism described herein, the CMISE/CMIP messages, are standardized and specified by ITU.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of auditing a first local number portability database associated with a first signal transfer point, comprising:
   sending, by a first audit manager, a request to the first signal transfer point, the request specifying at least one ported telephone number;
   receiving, by a first audit agent, the request at the first signal transfer point and looking up the specified at least one ported telephone number in the first local number portability database and obtaining at least one corresponding LNP data entry;
   sending, by the first audit agent, the at least one corresponding LNP data entry to the first audit manager;
   comparing the received at least one corresponding LNP data entry to data local to the first audit manager;
   sending, by the first audit manager, a request to a second signal transfer point, the request specifying the at least one ported telephone number;
   receiving, by a second audit agent, the request at the second signal transfer point and looking up the specified at least one ported telephone number in a second local number portability database associated with the second signal transfer point and obtaining at least one corresponding LNP data entry;
   sending, by the second audit agent, the at least one corresponding LNP data entry to the first audit manager;
   comparing, by the first audit manager, the received at least one corresponding LNP data entry from the first and second audit agents; and
   reporting the result of the comparison.

2. The method, as set forth in claim 1, further comprising looking up, by the first audit manager, the at least one corresponding LNP data entry of the at least one ported telephone number in a second local number portability database associated with a second signal transfer point, the second signal transfer point being a mate of the first signal transfer point.

3. The method, as set forth in claim 1, further comprising looking up, by the first audit manager, the at least one corresponding LNP data entry of the at least one ported telephone number in at least one second local number portability database associated with at least one second signal transfer point.

4. The method, as set forth in claim 1, further comprising composing, by the first audit manager, a CMISE message containing the at least one ported telephone number for sending to the first audit agent.

5. The method, as set forth in claim 1, further comprising composing, by the first audit manager, a CMISE message containing upper and lower bounds of a range of ported telephone numbers for sending to the first audit agent.

6. The method, as set forth in claim 1, further comprising composing, by the first audit manager, a CMISE M-GET message containing an IP address of a processor in the signal transfer point and the at least one ported telephone number for sending to the first audit agent.

7. The method, as set forth in claim 1, further comprising:

composing, by the first audit agent, at least one CMISE M-LINK message containing the at least one LNP data entry corresponding to the at least one ported telephone number, and sending the message to the first audit manager; and composing, by the first audit agent, at least one CMISE M-GET message containing an indication of the success of the audit, and sending the message to the first audit manager.

8. Computer readable medium having a program encoded thereon, comprising computer program code means adapted to perform the steps of claim 1 when said program is run on at least one computer.

9. The method, as set forth in claim 1, further comprising accessing a computer product having the steps of claim 1, the computer program being encoded on a computer readable medium.

* * * * *